US008241387B2

(12) United States Patent
Shah

(10) Patent No.: US 8,241,387 B2
(45) Date of Patent: Aug. 14, 2012

(54) AGRICULTURAL COMPOSITION

(76) Inventor: Deepak Pranjivandas Shah, Mumbai (IN)

( * ) Notice: Subject to any disclaimer, the term of this patent is extended or adjusted under 35 U.S.C. 154(b) by 345 days.

(21) Appl. No.: 12/522,259

(22) PCT Filed: Nov. 1, 2007

(86) PCT No.: PCT/IN2007/000518
§ 371 (c)(1),
(2), (4) Date: Jul. 7, 2009

(87) PCT Pub. No.: WO2008/084495
PCT Pub. Date: Jul. 17, 2008

(65) Prior Publication Data
US 2009/0308122 A1    Dec. 17, 2009

(30) Foreign Application Priority Data

Jan. 8, 2007    (IN) .............................. 40/MUM/2007

(51) Int. Cl.
*C05D 9/02*    (2006.01)
*C05D 9/00*    (2006.01)

(52) U.S. Cl. ................. 71/8; 47/58.1 SC; 71/11; 71/23; 71/28; 71/31; 71/32; 71/33; 71/54; 71/58; 71/61; 71/64.08; 71/64.1; 71/64.13; 71/903

(58) Field of Classification Search ................ 71/11–30, 71/8, 31, 32, 33, 54, 58, 61, 63, 64.1, 64.08, 71/64.13, 903; 47/58.1 SC
See application file for complete search history.

(56) References Cited

U.S. PATENT DOCUMENTS

| | | | |
|---|---|---|---|
| 1,795,364 A | 3/1931 | Ellis et al. | |
| 5,571,303 A * | 11/1996 | Bexton | ............................. 71/34 |
| 5,599,373 A | 2/1997 | Zanuccoli | |
| 6,749,659 B1 | 6/2004 | Yu et al. | |

FOREIGN PATENT DOCUMENTS

| | | |
|---|---|---|
| DE | 10 24 934 B | 2/1958 |
| GB | 2 292 140 A | 2/1996 |
| WO | 90/03350 A | 4/1990 |

* cited by examiner

*Primary Examiner* — Wayne Langel

(57) ABSTRACT

The invention relates to an agricultural composition wherein the composition comprises an effective amount of a sulphur active ingredient and at least one dispersing agent.

16 Claims, No Drawings

AGRICULTURAL COMPOSITION

BACKGROUND OF THE INVENTION

1. Field of the Invention

The present invention relates to an agricultural composition comprising an effective amount of a sulphur active ingredient and at least one dispersing agent.

2. Description of the Related Art

All the crops need balanced fertilization and presently high emphasis is laid on N—P—K as major nutrients for fertilizer applications. However, in the past couple of years sulphur has gained importance as a fourth major nutrient and its requirement in various crops and soils is increasing world wide due to the decrease in sulphur emissions and hence lower depositions into the soil.

Sulphur is known as an elemental fertilizer for feeding plants and is an essential component of certain vitamins and enzymes of plants. Sulphur, together with phosphorus and nitrogen takes part in the synthesis of certain plant proteins. Sulphur is insoluble in water, is easily inflammable and also displays irritable action on the human body. These properties of sulphur influence both its production as well as its use in the agricultural field.

Sulphur is also used as a rectifier of certain structural characteristics of the soil, including in particular its pH, which it shifts towards acidic values for alkaline soils. Sulphur is naturally present in the soil as a component of certain salts. When sulphur is oxidized to its sulphate form it serves as an essential nutrient for plant growth as sulphate is the only form in which plants can take up sulphur. Presently, sulphur is typically blended with other granular fertilizers such as phosphates, nitrates, urea and potash among others to provide it in a form suitable for application to the soil. Sulphur is available commercially as prills, soluble sulphur liquids, wettable powders and micronized powders. These compositions are then applied to the soil by various means such as broadcasting or banding to supply the soil with sulfur, as well as additional nutrients found in the granular fertilizers.

One problem associated with the use of these conventional compositions is that they need to be applied in very high dosages. The applicable dosage of these conventional compositions per acre is very high and can extend from about 10 kg/acre for Sulphur bentonite compositions to about 25 kg per acre for Sulphate based fertilizers and goes all the way to more than 100 kg/acre in case of gypsum. Also since these conventional compositions are used in high dosages there is an increased possibility of leaching in the soil making it unavailable to the plant for uptake. Large amount of money is being spent for drip and sprinkler irrigation for several horticultural crops and the use and practice of drip irrigation is increasing considerably. However, the conventional fertilizers comprising sulphur or sulphur plus bentonite mixtures cannot be applied through drip irrigation as the particle size of these compositions are large and the particles do not disperse in water, causing nozzle clogging in the irrigation equipment and resulting in a non-homogenous tank mixture at the time of application. These conventional compositions such as pellets and wettable powders do not exhibit uniform suspension resulting in uneven coverage on the plant and thereby affecting and minimizing the bio-efficacy of the product. They also need to be applied two to three months in advance so as to ensure timely conversion to sulphate and its uptake by the plant for which there is additional application and cost. Conventionally, acids such as sulfuric acid, nitric acid and/or phosphoric acid and ammonia (anhydrous) are used to produce these conventional fertilizers. The use of these chemicals creates a potentially hazardous environment for production of the fertilizer. In developing countries, these chemicals may be less available with the consequence that fertilizer must be imported at a considerable expense and crop yields are reduced in areas where food is most needed.

Sulphur has also been incorporated in fertilizer compositions for a different purpose. Specifically, sulphur has been used in the manufacture of compositions such as Sulphur bentonite pellets, Calcium Sulphate, Ammonium Sulphate and other sulphate based compostitions of fertilizers, the process of conversion of Sulphur to sulphate form is slow and sulphate is the only form in which plants can take up sulphur. In the conventional sulphur based fertilizers it is observed that sulphur is not timely converted into sulphate and hence is not readily available to the plant.

There is a need, therefore, to develop a composition which converts sulphur to its sulphate form almost instantly to be available for uptake by the plants and which delivers sulphur and other nutrients uniformly and effectively to the soil and the plant does not need to be applied in advance or as an additional application and can be applied with ongoing applications. Also there is a need to reduce the dosage substantially so as to develop a composition which is economical to the farmers. The composition exhibits a good suspension and dispersion properties in water and soil moisture so as to be miscible with other soluble fertilizers and hence applicable through drip and sprinkler irrigation to ensure a uniform spray and availability.

SUMMARY OF THE INVENTION

The present invention relates to a novel composition for agricultural use comprising an effective amount of a sulphur active ingredient and an at least one dispersing agent. According to an embodiment, the sulphur active ingredient is in the range of about 40% to about 98% (w/w) and the at least one dispersing agent is in the range of about 2% to about 60% (w/w).

According to an embodiment the agricultural composition is used as at least one of a fertilizer composition, a nutrient composition, a plant strengthener composition, a plant protectant composition, a soil conditioner composition and a yield enhancer composition.

According to an embodiment, the agricultural composition is formulated in a form selected from a group comprising at least one of wettable powders, water dispersible granules, dusting powders, suspension concentrates, emulsifiable concentrates, tablets, liquids and oil suspensions. According to an embodiment the agricultural composition is a water dispersible granule composition.

According to an embodiment the invention also relates to a method of treating the plant by applying the agricultural composition primarily to the basal and also to the foliar parts of the plant.

DETAILED DESCRIPTION OF THE INVENTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

The invention relates to an agricultural composition comprising an effective amount of a sulphur active ingredient and at least one dispersing agent.

According to an embodiment, the sulphur active ingredient in the agricultural composition can be in the range of about 40% to about 98% on a weight by weight basis.

According to an embodiment the at least one dispersing agent can be in the range of about 2% to about 60% on a dry weight by weight basis. Various dispersing agents are commercially available for use in agricultural compositions, such as those marketed by Rhone Poulenc, Witco, Westvaco, International Speciality products, Croda chemicals, Borregaard, BASF, Rhodia, etc. According to an embodiment the dispersing agents which can be used in the agricultural composition can be chosen from a group comprising polyvinylpyrrolidone, polyvinylalcohol, lignosulphonates, phenyl naphthalene sulphonates, ethoxylated alkyl phenols, ethoxylated fatty acids, alkoxylated linear alcohols, polyaromatic sulfonates, sodium alkyl aryl sulfonates, glyceryl esters, maleic anhydride copolymers, phosphate esters, condensation products of aryl sulphonic acids and formaldehyde, condensation products of alkylaryl sulphonic acids and formaldehyde, addition products of ethylene oxide and fatty acid esters, salts of addition products. of ethylene oxide and fatty acid esters, sulfonates of condensed naphthalene, addition products of ethylene oxide and fatty acid esters, salts of addition products of ethylene oxide and fatty acid esters, lignin derivatives, naphthalene formaldehyde condensates, sodium salt of isodecylsulfosuccinic acid half ester, polycarboxylates, sodium alkylbenzenesulfonates, sodium salts of sulfonated naphthalene, ammonium salts of sulfonated naphthalene, salts of polyacrylic acids, salts of phenolsulfonic acids and salts of naphthalene sulfonic acids. However, those skilled in the art will appreciate that it is possible to utilize other dispersing agents known in the art without departing from the scope of the claims of the present invention.

According to an embodiment the total number of percentage parts of the sulphur active ingredient and the at least one dispersing agent does not exceed 100 on a dry (w/w) basis.

According to an embodiment the agricultural composition can further comprise at least one of a wetting agent, a binding agent, a filler and an organic additive. According to an embodiment the wetting agent can be in the range of about 0.1% to about 5%. According to an embodiment the wetting agent which can be used in the agricultural composition can be chosen from a group comprising phenyl naphthalene sulphonates, alkyl naphthalene sulfonate, sodium alkyl naphthalene sulfonate, sodium salt of sulfonated alkylcarboxylate, polyoxyalkylated ethyl phenols, polyoxyethoylated fatty alcohols, polyoxythoxylated fatty amines, lignin derivatives, alkane sulfonates, alkylbenzene sulfonates, salts of polycarboxylic acids, salts of esters of sulfosuccinic acid, alkylnaphthalenesulphonates, alkylbenzenesulfonates, alkylpolyglycol ether sulfonates, alkyl ether phosphates, alkyl ether sulphates and alkyl sulfosuccinic monoesters. However, those skilled in the art will appreciate that it is possible to utilize other wetting agents known in the art without departing from the scope of the claims of the present invention.

According to an embodiment, the binding agent can be in the range of about 0.1% to about 7%. According to an embodiment the binding agent which can be used in the agricultural composition can be selected from a group comprising polyvinyl alcohols, phenyl naphthalene sulphonate, lignin derivatives, polyvinyl pyrrolidone, polyalkylpyrrolidone, carboxymethylcellulose, xanthan gum, polyethoxylated fatty acids, polyethoxylated fatty alcohols, ethylene oxide copolymer, propylene oxide copolymer, polyethylene glycols and polyethylene oxides. However, those skilled in the art will appreciate that it is possible to utilize other binding agents known in the art without departing from the scope of the claims of the present invention.

According to an embodiment the filler can be in the range of about 0.1% to about 10%. According to an embodiment the filler can be selected from a group comprising bentonite, sub-bentonite, attapulgite, kaolinites, montmorillonite, bauxite, hydrated aluminas, calcined aluminas, diatomaceous earth, chalk, fuller's earth, dolomite, kiesulguhr, loess, prophyllites, talc, vermiculites, limestone, natural and synthetic silicates, silicas and china clay. However, those skilled in the art will appreciate that it is possible to utilize other fillers known in the art without departing from the scope of the claims of the present invention.

According to an embodiment the organic additive used in the agricultural use composition can be in the range of about 0.01% to about 50%. According to an embodiment the organic additive can be selected from a group comprising macronutrients, micronutrients compost fertilizers, natural elements, natural organisms, trichoderma, humic acid extracts, bacillus thuringiensis, viruses, natural fungi, plant extracts, pyrethrums, biological control products, natural oils, natural extracts, minerals and urea groups. The micronutrients can be selected from zinc, iron, manganese, copper, boron, cobalt, vanadium, selenium, silicon, and nickel. The macronutrients can be selected from the group comprising nitrogen, phosphorous, potassium, calcium and magnesium. However, those skilled in the art will appreciate that it is possible to utilize other organic additives known in the art without departing from the scope of the claims of the present invention.

According to an embodiment the agricultural composition can be formulated in a form selected from a group comprising wettable powders, dusting powders, water dispersible granules, suspension concentrates, emulsifiable concentrates, tablets, pellets, liquids and oil suspensions. According to an embodiment the agricultural composition can be formulated as water dispersible granules. According to an embodiment the water dispersible granules are in the size range of about 0.1 mm to about 2.5 mm. The water dispersible granules can comprise particles. The particles can be in a size range of about 1 microns to about 12 microns. However, those skilled in the art will appreciate that it is possible to formulate the agricultural composition in other forms known in the art without departing from the scope of the claims of the present invention.

According to an embodiment the agricultural composition can be used as at least one of a fertilizer composition, a nutrient composition, a plant strengthener composition, a plant protectant composition, a soil conditioner composition and a yield enhancer composition. However, those skilled in the art will appreciate that it is possible to use the agricultural composition in other forms known in the art without departing from the scope of the claims of the present invention.

According to an embodiment a process of making the agricultural composition is disclosed. The process comprises initially blending the at least one dispersing agent and the sulphur active ingredient with an effective amount of water in a blending tank. The sulphur active ingredient and the at least one dispersing agent can be in a dry powder form. Blending in the tank, gives a slurry which is fairly homogenous in nature. Typically, the slurry comprises water, which may vary from about 25% to about 55% of the total slurry. According to an embodiment the blending step can further comprise adding at least one of the wetting agent, a binding agent, a filler and an organic additive in dry powder form to the blending tank. The slurry is then processed in a suitable wet grinding equipment, where the particle size is brought down to a range of about 1 microns to about 12 microns. The slurry formed after grinding is then screened for any oversize particles, if required. According to an embodiment the slurry is then subjected to drying and agglomeration in suitable spray drying equipment to obtain the agricultural composition.

According to an embodiment a method of treating a plant can comprise applying an effective amount of the agricultural composition to the basal and the foliar parts of the plant wherein the composition can comprise sulphur active ingredient in the range of about 40% to about 98% (w/w) and at least one dispersing agent in the range of about 2% to about 60%.

Bioefficacy Tests and Studies:

The following tests were conducted to understand certain attributes of the invention. The tests are illustrative of the laboratory and pilot plant studies conducted and are not intended to limit the scope of the alleged invention as set forth in the appended claims.

Test for Suspensibility: Outline of the Method

A suspension of known concentration in standard water or distilled water is prepared, placed in a prescribed measuring cylinder at a constant temperature and is allowed to remain undisturbed for the specified time. The top $9/10$ths are drawn off and the content of the ingredient in the bottom $1/10^{th}$ determined, so allowing the content of the top to be calculated.

Test for Spontaneity of Dispersion: Outline of the Method

A known amount of water dispersible granule is added to a defined volume of water and mixed by stirring to form a suspension. After standing for a short period, the top nine-tenths are drawn off and the remaining tenth dried and determined gravimetrically. The method is virtually a shortened test of suspensibility and is appropriate for establishing the ease with which a WG is dispersed uniformly in water.

The composition for agricultural use was described with reference to the following examples. Percentages in the examples are stated as a percentage of the total composition. These examples are provided as an illustration of the invention and are not intended to limit the scope of the invention.

EXAMPLE 1

A slurry is obtained by blending about 91% of the sulphur active ingredient, about 0.5% phenyl naphthalene sulphonate, 1% polyvinyl pyrrolidone, 5.5% of lignosulfonate and about 2% of an ethoxylated alkyl phenol in an effective amount of water. The slurry so formed is wet grinded in a suitable wet grinding equipment to obtain particles in the size range of about 1 micron to about 12 microns. The slurry is then dried in a fluidized bed drier and the particles are agglomerated to obtain the agricultural composition which is in the size range of about 0.1 mm to about 2.5 mm. The composition gave good results of suspension and dispersibility. (80%)

EXAMPLE 2

A slurry is obtained by blending about 84% of the sulphur active ingredient, about 9% phenyl naphthalene sulphonate, 1% polyvinyl pyrrolidone, 2.5% of lignosulfonate and about 3.5% of a polyvinyl alcohol in an effective amount of water. The slurry so formed is wet grinded in a suitable wet grinding equipment to obtain particles in the size range of about 2 microns to about 12 microns. The slurry is then dried in a fluidized bed drier and the particles are agglomerated to obtain the agricultural composition which is in the size range of about 0.1 mm to about 2.5 mm. The composition displayed good results of suspension and dispersibility. (82%)

EXAMPLE 3

A slurry is obtained by blending about 91% of the sulphur active ingredient and about 9% phenyl naphthalene sulphonate in effective amount of water. The slurry so formed is wet grinded in a suitable wet grinding equipment to obtain particles in the size range of about 2 microns to about 12 microns. The slurry is then dried in a fluidized bed drier and the particles are agglomerated to obtain the agricultural composition which is in the size range of about 0.1 mm to about 2.5 mm. The composition displayed good results of suspension and dispersibility (84%).

EXAMPLE 4

A slurry is obtained by blending about 65% of the sulphur active ingredient, about 5% phenyl naphthalene sulphonate, 25% polyvinyl pyrrolidone, 2.5% of lignosulfonate and about 2.5% of zinc in an effective amount of water. The slurry so formed is wet grinded in a suitable wet grinding equipment to obtain particles in the size range of about 2 microns to about 12 microns. The slurry is then dried in a fluidized bed drier and the particles are agglomerated to obtain the agricultural composition which is in the size range of about 0.1 mm to about 2.5 mm. The composition displayed good results of suspension and dispersibility. (80%).

EXAMPLE 5

A slurry is obtained by blending about 70% of the sulphur active ingredient, about 7% phenyl naphthalene sulphonate, 20% polyvinyl pyrrolidone, 0.5% of lignosulfonate and about 2.5% of naphthalene formaldehyde condensate in an effective amount of water. The slurry so formed is wet grinded in a suitable wet grinding equipment to obtain particles in the size range of about 1 micron to about 12 microns. The slurry is then dried in a fluidized bed drier and the particles are agglomerated to obtain the agricultural composition which is in the size range of about 0.1 mm to about 2.5 mm. The composition displayed good results of suspension and dispersibility. (82.5%)

EXAMPLE 6

A slurry is obtained by blending about 91% of the sulphur active ingredient, about 2% of a maleic anhydride copolymer, 1% of a polyethoxylated alkyl phenol and 6% of lignosulfonate in an effective amount of water. The slurry so formed is wet grinded in a suitable wet grinding equipment to obtain particles in the size range of about 1 micron to about 12 microns. The slurry is then dried in a fluidized bed drier and the particles are agglomerated to obtain the agricultural composition which is in the size range of about 0.1 mm to about 2.5 mm.

This agricultural composition obtained was used on different crops. The composition was applied on crucifers in a dosage of 3 kg/acre at about 3 to 10 days after transplantation.

Urea was also applied and broadcasted along with the agricultural composition. It was observed at the time of harvesting that there was a 15% to 20% increase in the yield with each head having more weight. Moreover, the foliage was dark green and there was tertiary and secondary profuse root development.

In oil crops such as groundnut, soybean and mustard with a dosage of 4 kg applied at about 21 to 25 days after seed sowing, the harvested product displayed 12% yield increase, an increased oil content and profuse root development.

In cereal crops such as rice and wheat a dosage of about 3 to 4 g/square meter in rice nurseries was applied 10 days after seed sowing at the time of transplantation exhibited a nursery crop with profuse root development and with healthy and strong seedling. A further dose of 3 kg of the agricultural composition when applied 5 days after transplantation resulted in more number of tillers, further profuse root development, superior grain quality, in about 5% increase in the protein content and an increased yield.

The composition was also applied to crops under the soil such as bulbs and tubers. When a dosage of 4 kg/acre was applied on onions and garlic in the nursery at about 20 days and 45 days after transplantation the bulbs exhibited a 10% increase in the size and more uniformity with a higher yield. Also the bulbs exhibited more pungency and the produce had a higher shelf life under normal conditions.

When 2 applications of the agricultural composition at a dosage of 3 kg/acre were made on potatoes in combination with urea at about 25 to 30 days after sowing, the harvest resulted in a larger and uniform size of the tubers with 25% increase in the yield and tubers with a thicker skin.

Other crops such as Cumin's, Maize, Sorghum, Sunflower, Tomatoes, Chili Cucurbits, Rape seed oil, Sugarcane, fruits such as Banana, Grapes, and Mangoes resulted in higher yield of about 10% to about 30%. The plants also exhibited lesser incidence of pest and disease occurrence.

The scope of the combination is not limited just by the above range, but also to other combinations, which can still maintain the same functional activity of the sulphur active ingredient known to those who are skilled in the art.

In the foregoing specification, specific embodiments of the present invention have been described. However, one of ordinary skill in the art appreciates that various modifications and changes can be made without departing from the scope of the present invention as set forth in the claims below. Accordingly, the specification and the examples are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the dependency of this application and all equivalents of those claims as issued. From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

I claim:

1. An agricultural composition comprising a sulfur active ingredient in a range of about 40% to about 98% (w/w) and at least one dispersing agent in a range of about 2% to about 60% (w/w), wherein the sulfur active ingredient is present in the agricultural composition in the form of granules in a size range of about 0.1 mm to about 2.5 mm and wherein the granules comprise particles in a size range of about 2 microns to about 12 microns whereby to facilitate a conversion of sulfur in the sulfur active ingredient to its sulfate form so that it is readily available for uptake by plants when the agricultural composition is applied to soil for the plants.

2. The agricultural composition according to claim 1, wherein the sulfur active ingredient is present in the agricultural composition in a range of 65% to 91% (w/w).

3. The agricultural composition according to claim 2, wherein, said dispersing agent is selected from the group consisting of polyvinylpyrrolidone, polyvinylalcohol, lignosulphonates, phenyl naphthalene sulphonates, ethoxylated alkyl phenols, ethoxylated fatty acids, alkoxylated linear alcohols, polyaromatic sulfonates, sodium alkyl aryl sulfonates, glyceryl esters, maleic anhydride copolymers, phosphate esters, condensation products of aryl sulphonic acids and formaldehyde, condensation products of alkylaryl sulphonic acids and formaldehye, addition products of ethylene oxide and fatty acid esters, salts of addition products of ethylene oxide and fatty acid esters, sulfonates of condensed naphthalene, addition products of ethylene oxide and fatty acid esters, salts of addition products of ethylene oxide and fatty acid esters , lignin derivatives, naphthalene formaldehyde condensates, sodium salt of isodecylsulfosuccinic acid half ester, polycarboxylates, sodium alkylbenzenesulfonates, sodium salts of sulfonated naphthalene, ammonium salts of sulfonated naphthalene, salts of polyacrylic acids, salts of phenolsulfonic acids and salts of naphthalene sulfonic acids.

4. The agricultural composition according to claim 2, wherein the composition further comprises a wetting agent in the range of about 0.1% to about 5%; a binding agent in the range of about 0.1% to about 7% and a filler in the range of about 0.1% to about 5%.

5. The agricultural composition according to claim 4, wherein said wetting agent is selected from the group consisting of phenyl naphthalene sulphonates, alkyl naphthalene sulfonates, sodium alkyl naphthalene sulfonate, sodium salt of sulfonated alkylcarboxylate, polyoxyalkylated ethyl phenols, polyoxyethoylated fatty alcohols, polyoxyethoxylated fatty amines, lignin derivatives, alkane sulfonates, alkylbenzene sulfonates, salts of polycarboxylic acids, salts of esters of sulfosuccinic acid, alkylnaphthalenesulphonates, alkylbenzenesulfonates, alkylpolyglycol ether sulfonates, alkyl ether phosphates, alkyl ether sulphates and alkyl sulfosuccinic monoesters.

6. The agricultural composition according to claim 4, wherein said binding agent is selected from the group consisting of polyvinyl alcohols, phenyl naphthalene sulphonate, lignin derivatives, polyvinyl pyrrolidone, polyalkylpyrrolidone, carboxymethylcellulose, xanthan gum, polyethoxylated fatty acids, polyethoxylated fatty alcohols, ethylene oxide copolymer, propylene oxide copolymer, polyethylene glycols and polyethylene oxides.

7. The agricultural composition according to claim 4, wherein said filler is selected from the group consisting of bentonites, sub-bentonites, attapulgites, kaolinites, montmorillonites, bauxite, hydrated aluminas, calcined aluminas, diatomaceous earth, chalk, fuller's earth, dolomite, kiesulguhr, loess, prophyllites, talc, vermiculites, limestone, natural and synthetic silicates, silicas and china clay.

8. The agricultural composition according to claim 2, wherein the composition further comprises an organic additive in an amount in the range of about 0.01% to about 50% on a w/w basis.

9. The agricultural composition as claimed in claim 8, wherein said organic additive is selected from the group consisting of macronutrients, micronutrients, compost fertilizers, natural elements, natural organisms, bacillus thuringiensis, viruses, natural fungi, plant extracts, pyrethrums, biological control products, natural oils, natural extracts, minerals and urea groups.

10. The agricultural composition according to claim 4, wherein the composition further comprises an organic additive in an amount in the range of about 0.01% to about 50% on a w/w basis.

11. The agricultural composition as claimed in claim 10, wherein said organic additive is selected from the group consisting of macronutrients, micronutrients, compost fertilizers, natural elements, natural organisms, bacillus thuringiensis, viruses, natural fungi, plant extracts, pyrethrums, biological control products, natural oils, natural extracts, minerals and urea groups.

12. A method for treating a plant comprising providing the agricultural composition as claimed in claim 1, and applying the agricultural composition as a fertilizer composition, a nutrient composition, a plant strengthener composition, a soil conditioner composition or a yield enhancer composition to soil for the plant.

13. A method for treating a plant comprising providing the agricultural composition as claimed in claim 2, and applying the agricultural composition as a fertilizer composition, a nutrient composition, a plant strengthener composition, a soil conditioner composition or a yield enhancer composition to soil for the plant.

14. A method of treating a plant comprising applying an effective amount of an agricultural composition to basal and foliar parts of the plant, wherein the composition comprises a sulfur active ingredient in a range of about 40% to about 98% (w/w) and at least one dispersing agent in a range of about 2% to about 60% (w/w), wherein the sulfur active ingredient is present in the agricultural composition in the form of granules in a size range of about 0.1 mm to about 2.5 mm and wherein the granules comprise particles in a size range of about 2 microns to about 12 microns.

15. The method according to claim 14, wherein the sulfur active ingredient is present in the agricultural composition in a range of 65% to 91% (w/w).

16. The method according to claim 15, wherein the composition further comprises a wetting agent in the range of about 0.1% to about 5%; a binding agent in the range of about 0.1% to about 7% and a filler in the range of about 0.1% to about 5%.

* * * * *